April 30, 1929. R. W. BURNETT 1,710,965
PIPE ANCHOR AND ANGLE COCK HOLDER
Filed June 15, 1923  2 Sheets-Sheet 1
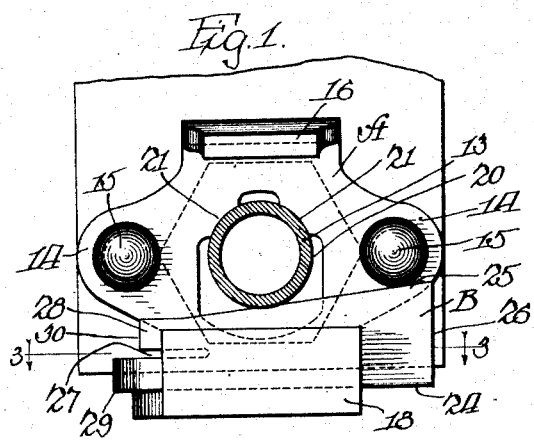
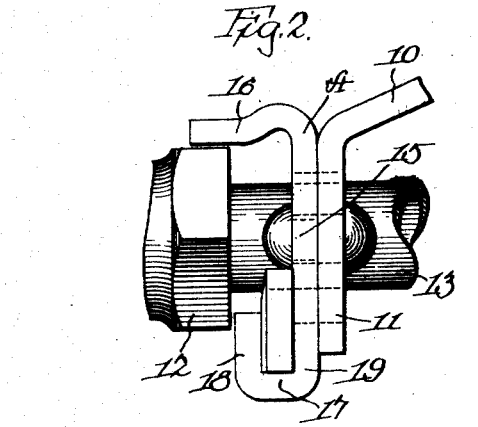
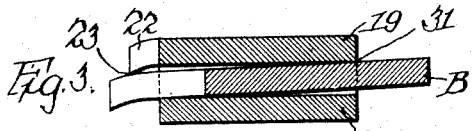
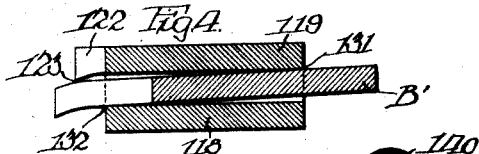
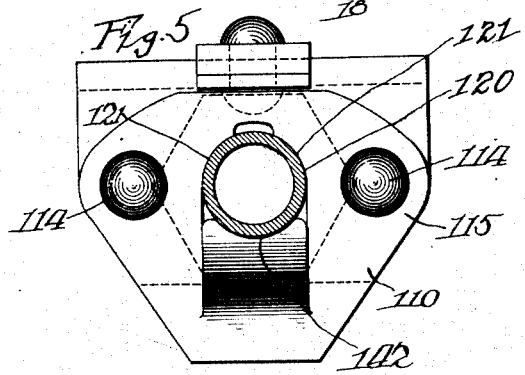
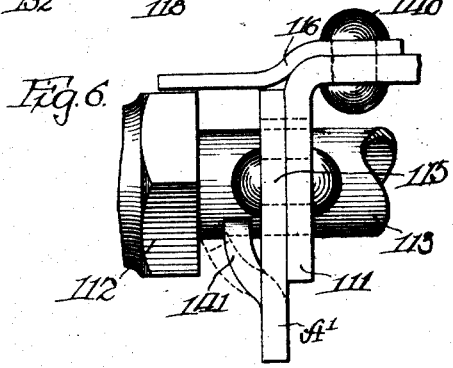
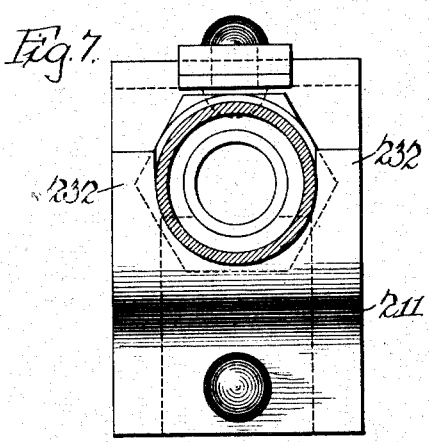
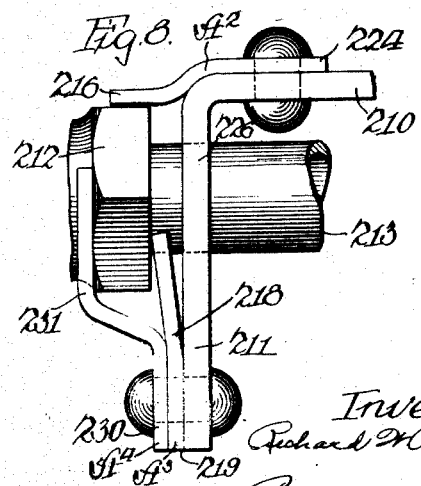

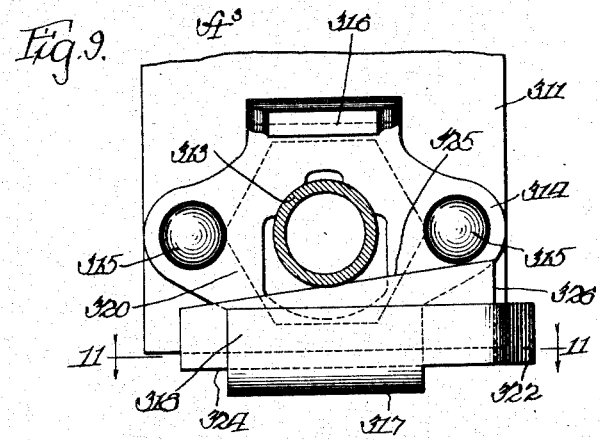
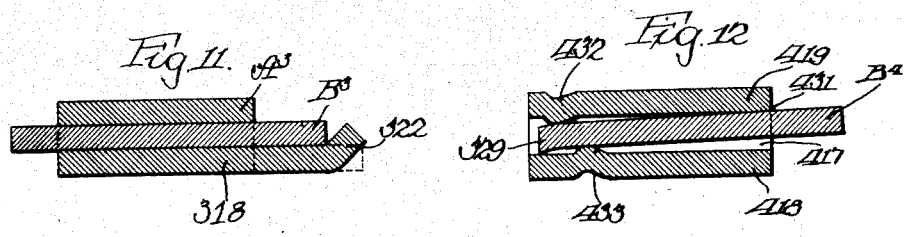
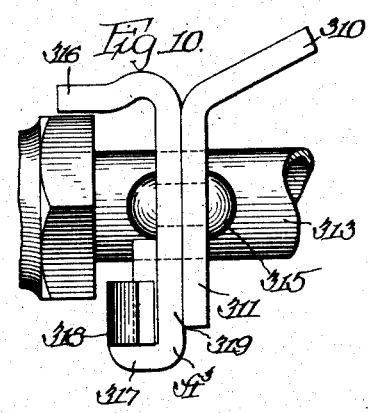

Patented Apr. 30, 1929.

1,710,965

UNITED STATES PATENT OFFICE.

RICHARD W. BURNETT, OF CHICAGO, ILLINOIS.

PIPE ANCHOR AND ANGLE-COCK HOLDER.

Application filed June 15, 1923. Serial No. 645,501.

This invention relates to improvements in pipe anchors and angle cock holders.

One object of the invention is to provide means of simple construction for anchoring pipes, which will be efficient in operation and which may be manufactured and applied at very small expense, the pipe anchor being especially adapted to train pipes and also wherein certain of the features may be incorporated in angle cock holders.

Another and more specific object of the invention is to provide a pipe anchor, including a bracket member receiving the pipe, and a wedge key, wherein simple and efficient means is provided for retaining the key in position.

A further object of the invention is to provide means for anchoring pipes which may be made at small expense in the form of pressed steel plates, forgings or castings.

Other objects and advantages of the invention will more clearly appear from the description and claims hereinafter following.

In the drawing forming a part of this specification, Figure 1 is a transverse, sectional view through a train pipe, showing my improvements in connection therewith. Fig. 2 is a side elevational view looking from the right of Fig. 1. Fig. 3 is a detail, horizontal, sectional view corresponding substantially to the line 3—3 of Fig. 1. Fig. 4 is a view similar to Fig. 3 illustrating a modification of the invention. Figs. 5 and 6 are views similar to Figs. 1 and 2 illustrating a different embodiment of the invention. Figs. 7 and 8 are views similar to Figs. 1 and 2 illustrating another embodiment of the invention. Figs. 9, 10 and 11 are views similar to Figs. 1, 2 and 3, respectively, illustrating another embodiment of the invention. And Fig. 12 is a view similar to Fig. 2, illustrating still another embodiment of the invention.

In said drawing, referring first to the construction illustrated in Figs. 1, 2 and 3, 10 denotes a bracket or support adapted to be attached to the end sill or other member, not shown, at the end of the car. The bracket 10 has a depending vertical flange 11, to which my improved combined pipe anchor and angle cock holder is adapted to be secured. The angle cock proper is indicated at 12, the same being attached to the usual pipe 13, which is extended through an opening provided therefor in the support 10. The improved pipe anchor and angle cock holder proper, as shown in Figs. 1, 2 and 3 comprises a metal plate designated generally by the reference character A. Said plate A is preferably formed from a rolled plate of mild steel possessing inherent resiliency and is cut so as to provide two laterally opposed ears 14—14 to accommodate securing rivets 15—15 by which the holder is held directly against the support 10. The cut plate A is also provided with an integral flange 16 at the top thereof which is extended outwardly at approximately right angles, as best shown in Fig. 2 and offset downwardly, so as to overlie and engage one face of the usual hexagonal nut of the angle cock so as to hold the latter against turning and thereby maintain the angle cock in position required by railroad practice. With the arrangement of overhanging flange 16, as shown, it is evident that the same can be adjusted by hammering, so as to bend it up and down to thereby adapt it for such variations as occur in practice.

At the lower end, the plate A is provided with another flange of considerable width, as best shown in Figs. 1 and 3, said bottom flange being first bent horizontally outwardly as indicated at 17 and then upwardly as indicated at 18, so as to be spaced from the main or back web 19 of the plate. The plate A is apertured to accommodate the passage of the pipe 13 as indicated at 20, the aperture 20 being appreciably larger than the diameter of the pipe. The plate may be provided with two combined centering and bearing shoulders 21—21 for the pipe. The lower portion of the web 19 at one edge is formed with an extension 22 bent toward the flange 18 thereby providing a tooth-like member having a relatively sharp corner 23.

The horizontal bottom flange 17 provides an elongated bearing or support for a wedge key designated generally by the reference character B, which is adapted to be driven in so as to wedge the pipe snugly against the bearings 21—21 as best shown in Fig. 1.

The key B preferably consists of a section of sheet metal plate of mild steel. The key B is of uniform thickness throughout its length having a flat bottom edge 24, inclined upper edge 25 and a flat edge 26 at its larger end. At the narrow end, the key has an elongated slit 27 dividing the narrow end of the same into two spaced tangs 28 and 29. One of the tangs, preferably the tang 28, has a blunt end 30, by which the key may be more easily driven out by striking with a hammer. The other tang 29 is of slightly greater length than the tang 28 and is adapted to be bent laterally when the key is driven between the flange 18 and the web 19.

Upon reference to Fig. 3 it will be seen that when the key B is driven between the flange 18 and the web 19 of the plate, the front edge of the tang 29 by engagement with the projecting edge 23 of the portion 22 will be bent laterally as shown. This results in the clamping of the key at three spaced points lengthwise thereof, the inner edge 31 at the one end of the web 19, the edge 32 at the opposite end of the flange 18 and at the corner 23 on the projection 22, thus holding the key in fixed position. Removal of the key will further be prevented due to the tang 29 being bent around the adjacent portion of the flange 18 of the anchor.

Referring next to the construction illustrated in Fig. 4, the arrangement shown is in all respects similar to that shown in Fig. 3, the only difference being that the parts are formed of cast metal. In this figure 119 indicates the web of the plate, 118 the upwardly bent flange and B' the key which is of exactly the same construction as the key B of the form shown in Figs. 1, 2 and 3. The web 119 is provided with a projection 122 corresponding to the projection 22 shown in Fig. 3 having the inner side thereof extending beyond the adjacent surface of the web 119 thereby providing a tooth-like point 123 extending toward the flange 118. The key B' is retained in position similarly to the key B, being held between the contacting edge portions 131 and 132 and 123 of the web 119, the flange 118 and the tooth-like member 122.

Referring next to the construction illustrated in Figs. 5 and 6, 110 denotes a bracket or support secured to the end sill or other member, not shown, at the end of the car. The bracket 110 has a depending vertical flange 111 at its outer end, to which the improved pipe anchor indicated at A' is attached. The pipe anchor in this instance consists of a plate having an opening 120 therethrough with bearing edges 121 for the pipe. The plate A' is adapted to be riveted directly to the portion 111 of the bracket, the arm 111 of the latter being provided with an opening in alinement with the opening 120. To the upper face of the bracket or support 110 is secured a strip 116 by any suitable means, such as rivets 140. The strip 116 extends outwardly beyond the vertically disposed plate A' at approximately right angles thereto and is downwardly offset to engage one face of the usual hexagonal nut of the angle cock to hold the latter against turning, thereby maintaining the same in the position required by railroad practice. It will be evident that the strip 116 which functions similarly to the flange 16 of the preferred form, can be adjusted by hammering so as to bend it up and down and thereby adapt it to such variations as occur in practice. The plate A' is apertured at opposite sides as indicated at 114—114 to accommodate securing rivets 115—115 by which the holder is directly held against the support 110. Below the opening 120, the plate A' is provided with an integral, outwardly and upwardly bent finger 141 adapted to be forced inwardly toward the body of the plate to clamp the pipe between the same and the bearing surfaces 121. The finger 141 is formed by slitting the plate downwardly from the opening 120 along parallel lines and then bending the portion thus separated as clearly indicated in dotted lines in Fig. 6. As shown in Fig. 5, the finger 141 has an upper rounded edge 142 adapted to engage the pipe. When used to anchor the pipe the finger 141 is hammered to the position shown in solid lines in Fig. 6, so as to wedge it against the pipe and thereby securely anchor the pipe between the three points of support on the bearing surfaces 142 of the finger and 121—121 of the plate proper. It will also be noted that a sufficient space is left between the finger 141 and the main part of plate A' to permit the insertion of a tool for disengaging the finger 141 when desired.

Referring next to the construction illustrated in Figs. 7 and 8, 210 denotes a support having a downwardly extending flange 211 to which the pipe anchoring means are adapted to be secured. The angle cock is indicated at 212 and the pipe at 213. In this arrangement, the improved holding means are made in three separate parts consisting of a top member $A^2$ and a pair of bottom members $A^3$ and $A^4$. The top member $A^2$ consists of a short piece of plate metal having inherent resiliency, the same comprising a flat portion 224 directly riveted to the top of the horizontally extended portion of the support 210 and a downwardly offset flange 216 adapted to engage the hexagonal nut of the angle cock and hold it against turning. The bottom member $A^3$ has the bottom portion 219 thereof lying directly against and secure to the depending flange 211. Near its upper end, the bottom member $A^3$ is outwardly bent as indicated at 218, so as to extend at an angle outwardly away from the flange 211. The flange 211 is provided with an opening 220 adapted to receive a pipe 213. The bottom member $A^4$ has the bottom section 230 thereof directly lying against the section 219 of the member $A^3$ and is rigidly held in position by rivets which also serve to secure the member $A^3$ to the flange 211. The bottom member $A^4$ is outwardly offset as indicated at 231 and the upper end of the portion 231 is forked as indicated at 232 to embrace the angle cock and at a point in front of the hexagonal nut thereof. The forked portion 231 of the member $A^4$ serves to effectively hold the angle cock in position when accidentally broken off, preventing the same from dropping down on the tracks. When used to anchor the pipe, the angularly extending portion 218 of the member A³ is hammered toward the flange 211, assuming approximately the position shown in full lines in Fig. 8, where it wedges against the pipe and thereby securely anchors the pipe between it and the upper side wall of the opening 220. The bottom member A⁴ is flexible, thereby permitting the same to automatically adjust itself to slight variations in position of the angle cock due to the variations in length of pipes or looseness of threads.

Referring next to the construction illustrated in Figs. 9, 10 and 11, the arrangement shown is similar to the construction of pipe anchor and angle cock holder shown in Figs. 1, 2 and 3, differing therefrom only in details of construction of the key receiving portion thereof, the design of the lower portion of the web and flange of the plate being somewhat modified. In Figs. 9, 10 and 11, 310 denotes a bracket or support having a depending vertical flange 311 to which the plate A³, having ears 314, is secured by rivets 315. The plate A³ is also provided with an integral flange 316 which is adapted to overlie and engage one face of the usual hexagonal nut of the angle cock, the flange 316 being bendable by hammering to adapt it for such variations as occur in actual practice.

At its lower end the plate A³ is provided with another relatively wide flange, first bent horizontally as indicated at 317 and then upwardly as indicated at 318, so as to be spaced from the main or back web 319 of the plate a distance corresponding to the thickness of the flat key B³. The plate A³ is apertured to accommodate the passage of the pipe 313 as indicated at 320, the aperture being appreciably larger than the diameter of the pipe. The plate may be provided with two centering and bearing surfaces 321—321 for the pipe. The upwardly bent flange portion 318 is formed with an extension 322 which is adapted to be hammered or bent over the end of the key B³ after the latter has been driven into place to retain it in position.

The key B³ consists of a section of sheet metal plate of mild steel and of uniform thickness throughout its length, having a flat bent edge 324, an inclined upper edge 325 and a flat edge 326 at its larger end.

Upon reference to Figs. 9, 10 and 11, it will be seen that when the key B³ is driven between the flange 318 and the web 319, the same will wedge the pipe against the abutments 321 in a manner similar to the key B illustrated in Figs. 1, 2 and 3. As clearly shown the extension 322 projects beyond the flat edge 326 of the key and when bent or hammered over toward the web 319 as indicated, effectively holds the key in position.

Referring next to the construction illustrated in Fig. 12, the arrangement is in all respects similar to that shown in Fig. 3, the only difference being that instead of providing the web of the plate with a tooth-like extension, the web and the upwardly bent portion of the adjacent flange are each provided with projections adapted to engage the key. In Fig. 12 the web of the plate is indicated by 419, the horizontal portion of the flange 417 and the upwardly bent portion of the latter by 418. The opposed inner surfaces of the web 419 and flange portion 418 are respectively provided with projections 432 and 433 spaced inwardly from the edge of the web and the flange, the projection 433 being spaced inwardly a greater distance than the projection 432. In this instance the projections are illustrated as formed by indenting the web and flange, but it will be evident that the same may be formed in any other suitable way.

The key B⁴ is in all respects similar to the key B shown in Figs. 1, 2 and 3. When the key B⁴ is driven between the flange 318 and the web 319 of the plate, the front edge of the tang 329, by engagement with the projection 432 will be bent laterally, as shown. This results in the clamping of the key at three spaced points, lengthwise, thereof; the inner edge 431 at one end of the web 419, the projection 432 and the projection 433, thus holding the key in fixed position. Removal of the key will further be prevented due to the tang 429 being bent around the projection 433 while the key is being driven home.

One advantage of my improved key and locking arrangement therefor, as compared with prior devices, is that the locking of the key is accomplished automatically by the deformation of the key as it is driven home. Heretofore, the operator has been required to perform a separate operation on the key to lock it in place and frequently, careless operators have omitted to do this with the result that the key falls out.

I have herein shown and described what I now consider the preferred manner of carrying out the invention, but the same is merely illustrative and I contemplate all changes and modifications that come within the scope of the claims appended hereto.

I claim:

1. A pipe anchor adapted to be secured to a fixed support, said anchor including a sheet of metal plate having spaced substantially parallel portions united by an integral angular member, one of said portions being provided with abutment means for one side of the pipe, and the other portion having its free edge disposed near the opposite side of the pipe, said first named portion being provided with a lug extending toward said last named portion, whereby a key may be driven against said pipe while bearing against said angular member and while between said first and second named portions, said key being retained in position by being wedged against said lug.

2. In a pipe anchor adapted to be secured to a fixed support, the combination with a metal plate having an opening therethrough adapted to accommodate the passage of a pipe; of a key, said plate at the bottom thereof having an upwardly extending flange portion spaced from the main portion of the plate forming a guideway adapted to accommodate the key, said guideway being of greater width than the thickness of the key and the edge of one of said portions adjacent one end of said guideway being displaced toward the adjacent edge of the opposite portion, whereby the end portion of the key is bent over while being driven into position and the key tightly clamped between said edges and one of the edges at the opposite end of the guideway.

3. In a pipe anchor adapted to be secured to a fixed support, the combination with a bracket having an opening therethrough adapted to accommodate a pipe, and having a guideway at one side of the opening; of a flat key of uniform thickness and of lesser thickness than the width of the guideway adapted to be driven into said guideway for wedging the pipe within said opening, said key and guideway having three longitudinally spaced points of contact, two of said points of contact of the key with one of the walls of the guideway being on the same side of the key and out of line with reference to said wall of the guideway, whereby the key is automatically clamped in said guideway while traversing the same during the driving operation.

4. In a pipe anchor adapted to be secured to a fixed support, the combination with a bracket having an opening therethrough adapted to accommodate a pipe, and having a guideway at one side of the opening; of a flat key adapted to be driven into said guideway for wedging the pipe within said opening, said key being of uniform thickness throughout, tapered in the direction of its length and provided at its narrower end with a slit dividing said end into two spaced tangs, one of said tangs having a blunt end and the other of said tangs being adapted to bend when the key is driven into place, and means in said guide-way cooperating with said key to bend the same while traversing said guide-way to effect binding of the key in said guide-way.

5. In a pipe anchor adapted to be secured to a fixed support, the combination with a metal plate having an opening therethrough adapted to accommodate the passage of a pipe; of a key, said plate at the bottom thereof having an upwardly extending flange portion spaced from the main portion of the plate forming a guideway adapted to accommodate the key, said guideway being of greater width than the thickness of the key and the opposed walls of said guideway being provided with inwardly extending projections, whereby the end portion of the key is bent over while being driven into position and the key tightly clamped by the said projections and one of the edges at the opposite end of the guideway.

6. In a pipe anchor adapted to be secured to a fixed support, said anchor including pipe receiving means; a key having a predetermined conformation; and a key-way for said anchor adapted for the reception of said key, said keyway being of uniform width, and means fixed to one of the walls of the keyway laterally, inwardly overhanging said wall, said means which overhangs the keyway effecting binding of the key in said keyway when the key is driven home.

7. In a pipe anchor adapted to be secured to a fixed support, said anchor including a plate provided with abutment means for one side of a pipe, and a key-way, whereby a key may be driven against said pipe to hold the same in position, while bearing in said key-way, and means fixed with respect to said plate and projecting into the path of the key while the key is being driven home in said key-way to bring about flexing of the key and cause the same to bind with respect to said key-way.

In witness that I claim the foregoing I have hereunto subscribed my name this 11th day of June 1923.

RICHARD W. BURNETT.